(12) United States Patent  
Green et al.

(10) Patent No.: US 7,064,539 B2
(45) Date of Patent: Jun. 20, 2006

(54) METHOD FOR HARD DISK DRIVE FLIP DISK DIAGNOSTICS

(75) Inventors: Paul Marion Green, Hollister, CA (US); Garth Wade Helf, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 486 days.

(21) Appl. No.: 10/637,962

(22) Filed: Aug. 8, 2003

(65) Prior Publication Data

US 2005/0030014 A1    Feb. 10, 2005

(51) Int. Cl.
*G01R 33/12* (2006.01)
*G11B 5/00* (2006.01)

(52) U.S. Cl. .................... 324/210; 324/212; 360/77.04

(58) Field of Classification Search ........ 324/210–213; 360/77.04
See application file for complete search history.

(56) References Cited

U.S. PATENT DOCUMENTS 6,330,129 B1 * 12/2001 Takekoh et al. ............ 360/133
6,504,668 B1 *  1/2003 Takeuchi et al. ......... 360/77.04
6,624,963 B1 *  9/2003 Szita ...................... 360/77.08

* cited by examiner

*Primary Examiner*—Bot LeDynh
(74) *Attorney, Agent, or Firm*—Zilka-Kotab, PC

(57) ABSTRACT

A method for identifying a problem with a magnetic disk, comprising testing both sides of a disk for read errors using a pair of heads, flipping the disk 180 degrees, again testing both sides of the disk for read errors using the same heads, determining whether one side of the disk has more errors than the other side both before and after the flip, and determining that the disk is the cause of the read errors if the same side of the disk still has more errors than the other side after the flip.

22 Claims, 5 Drawing Sheets

METHOD FOR HARD DISK DRIVE FLIP DISK DIAGNOSTICS

FIELD OF THE INVENTION

The present invention relates to disk drive testing, and more particularly, this invention relates to a flip disk diagnostic method for identifying the cause of problems in the disk drive.

BACKGROUND OF THE INVENTION

A typical disk drive storage system includes one or more magnetic disks which are mounted for co-rotation on a hub or spindle. A typical disk drive also includes a transducer supported by a hydrodynamic bearing which flies above each magnetic disk. The transducer and the hydrodynamic bearing are sometimes collectively referred to as a data head or a product head. A drive controller is conventionally used for controlling the disk drive based on commands received from a host system. The drive controller controls the disk drive to retrieve information from the magnetic disks and to store information on the magnetic disks. An electromechanical actuator operates within a negative feedback, closed-loop servo system to move the data head radially or linearly over the disk surface for track seek operations and holds the transducer directly above a desired track or cylinder on the disk surface for track following operations.

Typically the magnetic disks 2 also comprise servo sectors 18 which are recorded at a regular interval and interleaved with the data sectors 12, as shown in FIG. 1. A servo sector, as shown in FIG. 2, typically comprises a preamble 20 and sync mark 22 for synchronizing to the servo sector; a servo data field 24 comprising coarse position information, such as a Gray coded track address, used to determine the radial location of the head with respect to the plurality of tracks; and a plurality of servo bursts 26 recorded at precise intervals and offsets from the track centerlines which provide fine head position information. When writing or reading data, a servo controller performs a "seek" operation to position the head over a desired track; as the head traverses radially over the recording surface, the Gray coded track addresses in the servo data field 24 provide coarse position information for the head with respect to the current and target track. When the head reaches the target track, the servo controller performs a tracking operation wherein the servo bursts 26 provide fine position information used to maintain the head over the centerline of the track as the digital data is being written to or read from the recording surface.

Every disk in every drive will have errors. Prior to shipping disk drives, manufacturers test each drive using a write then read process to determine whether the number of errors is below a predetermined threshold. If the number of errors is above the threshold, the drive fails. However, it is not known at this point whether the problem lies with the disk, the head, or other hardware. What is therefore needed is a method for efficiently determining whether the problem on a failed drive is disk related or head related.

SUMMARY OF THE INVENTION

The present invention solves the problems described above by providing a system and process for identifying a problem in a hard disk drive. A hard disk drive having a two-sided disk and a pair of heads is assembled. Both sides of the disk are tested for read errors. The number of errors is quantified. The drive is passed if the number of errors is below a predetermined threshold, and failed if the number of errors is above the predetermined threshold. If the drive fails, the disk is removed from the drive and flipped 180 degrees. The disk is reinstalled in the drive and again both sides of the disk are tested for read errors using the same heads. A determination is made as to whether one side of the disk has more errors than the other side both before and after the flip, i.e., whether the errors follow the disk. Root cause failure analysis can be performed on the disk if the same side of the disk still has more errors than the other side after the flip. Root cause failure analysis can be performed on other components of the disk drive, e.g., heads, circuits cables, etc. if the same side of the disk does not have more errors than the other side after the flip.

Preferably, at least some of the errors are plotted on a graphical representation of each side of the disk. The plots are used to determine whether one side of the disk has more errors than the other side both before and after the flip.

In one embodiment, the root cause failure analysis of the disk includes a visual inspection of the disk. Sites of some or all of the errors on the disk are marked for visual inspection, such as by using magnetic particles or a candela.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
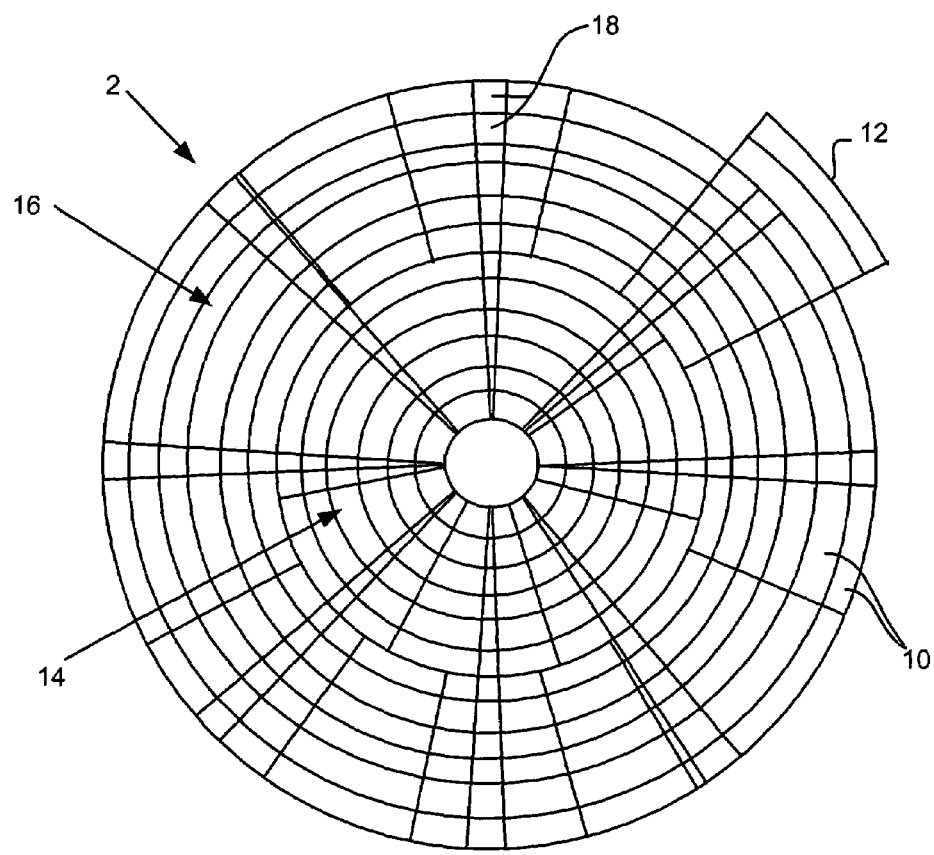
FIG. 1 shows a typical format for of a disk surface comprising a plurality of radially spaced, concentric data tracks partitioned into a number of data sectors and embedded servo sectors for positioning the heads over the disk surfaces while seeking and tracking.
Figure 2:
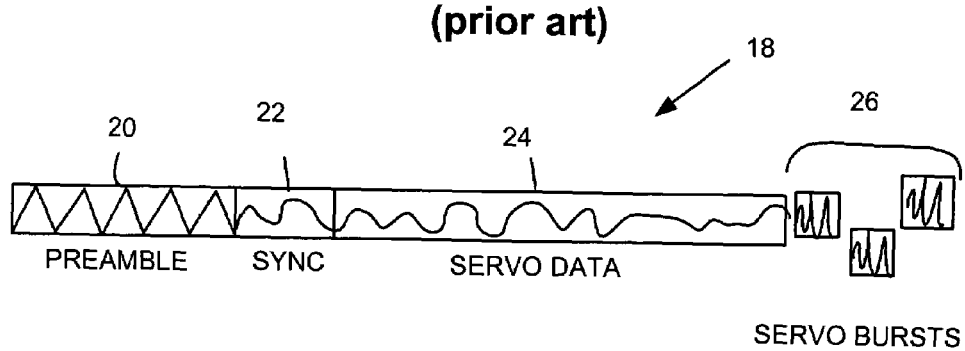
FIG. 2 shows a typical format of an embedded servo sector.
Figure 3:
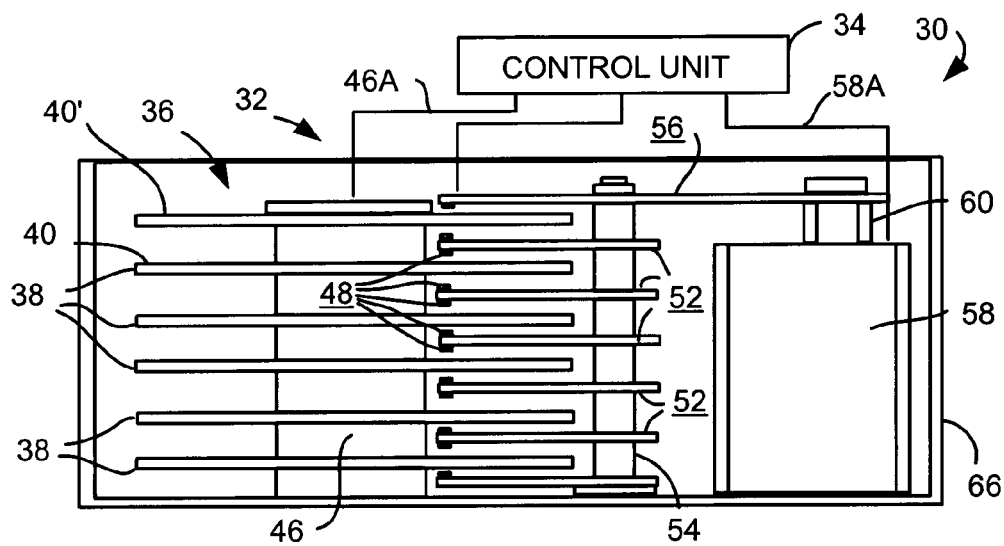
FIG. 3 is a schematic and simplified vertical sectional view of a rigid magnetic disk drive unit embodying the present invention.

Referring now to the drawings wherein like reference numerals designate like or similar parts throughout the several views there is illustrated in FIG. 3 a cross-sectional diagram of parts of a data storage disk drive system 30 including a rigid magnetic disk drive unit generally designated as 32 and a control unit generally designated as 34. While a magnetic disk drive unit is illustrated, it should be understood that other mechanically moving memory configurations may be used. Unit 32 is illustrated in simplified form sufficient for an understanding of the present invention because the utility of the present invention is not limited to the details of a particular drive unit construction. After data storage disk drive system 30 is completely assembled, servo information used to write and read data is written using the disk drive system 30.

Figure 4:
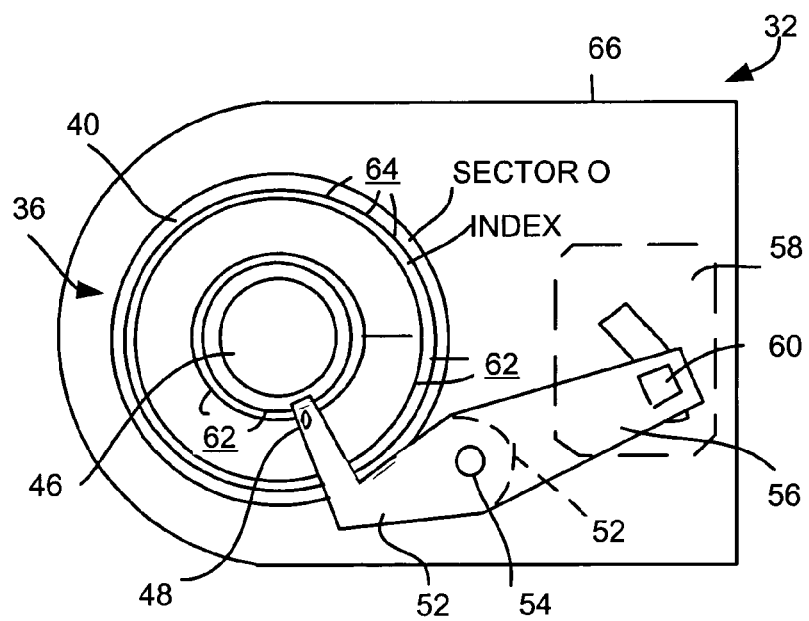
FIG. 4 is a top plan view of the structure shown in FIG. 3.

Referring now to FIGS. 3 and 4 of the drawing, disk drive unit 32 includes a stack 36 of disks 38 having two magnetic surfaces 40. The disks 38 are mounted in parallel for simultaneous rotation on and by an integrated spindle and motor assembly 46. Data information on each disk 38 are read and/or written to by a corresponding transducer head 48 movable across the disk surface 40. In a disk drive using a dedicated or hybrid servo, one of the disk surfaces 40' stores servo information used to locate information and data on the other disk surfaces 40.

Transducer heads 48 are mounted on flexure springs 50 carried by arms 52 ganged together for simultaneous pivotal movement about a support spindle 54. One of the arms 52 includes an extension 56 driven in a pivotal motion by a head drive motor 58. Although several drive arrangements are commonly used, the motor 58 can include a voice coil motor 60 cooperating with a magnet and core assembly (not seen) operatively controlled for moving the transducer heads 48 in synchronism in a radial direction in order to position the heads in registration with data information tracks or data cylinders 62 to be followed and access particular data sectors 64. Although a rotary actuator is shown, it should be understood that a disk drive with a linear actuator can be used. Data storage disk drive system 30 is a modular unit including a housing 66. The various components of the disk drive system 30 are controlled in operation by signals generated by control unit 34 such as motor control signals on line 46A and position control signals on line 58A.

Numerous data information tracks 62 are arrayed in a concentric pattern in the magnetic medium of each disk surface 40 of data disks 38. A data cylinder includes a set of corresponding data information tracks 62 for the data surfaces 40 in the data storage disk drive system 30. Data information tracks 62 include a plurality of segments or data sectors 64 each for containing a predefined size of individual groups of data records which are saved for later retrieval and updates. The data information tracks 62 are disposed at predetermined positions relative to servo information, such as a servo reference index. In FIG. 4 one sector 64 is illustrated as SECTOR O with a fixed index or mark INDEX for properly locating the first data sector. The location of each next sector 64 is identified by a sector identification (SID) pulse read by transducer heads 48 from surfaces 40, 40'.

As mentioned above, when a drive is assembled it is tested for errors. When the manufacturer performs the customer format, every data bit that is missing/lost is mapped and placed on a p-list which tells the drive not to use that particular bit or sector. However, the manufacturer places limits on the number of errors. If the number of errors is above a predetermined threshold, the drive will fail. If the drive does not fail due to a card or cable, the problem is probably the head or disk. However, it is impossible to determine whether the failure is caused by the head or the disk without physically tearing down the drive and performing additional tests.

Disclosed is a method for hard disk drive (HDD) flip disk diagnostics. This method has been demonstrated to quickly isolate disk media failures (such as disk surface scratches, sputtering defects, etc.) vs. possible head related failures, by conducting flip disk diagnostics at the HDD level, without requiring additional equipment.

HDD flip disk diagnostics is a method to isolate HDD disk media problems from head related problems. This method has been proven to very quickly isolate and verify disk vs. head related problems that are not apparent during first pass HDD testing. Briefly, if a high rate of errors are found, disks are physically flipped over and retested within the same hard disk drive to determine if the errors follow the disk or head. Once it is determining that the errors follow the disk or head, root cause failure analysis can be performed to determine the cause.

Figure 5:
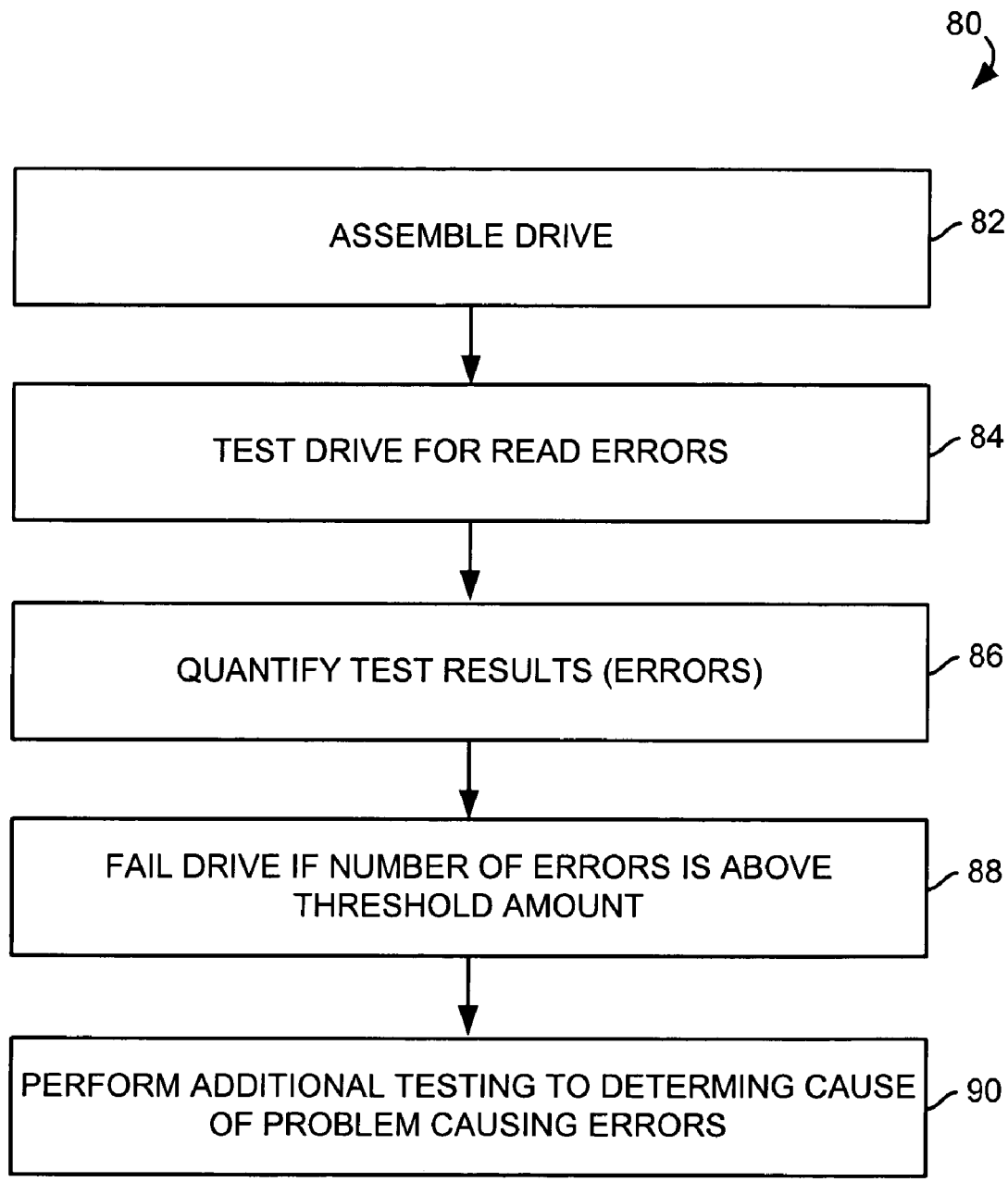
FIG. 5 is a flow diagram illustrating a method for determining a root cause of a disk drive error.

FIG. 5 illustrates a method 80 for testing a drive for determining a root cause of an error. The drive is assembled in step 82. Note also that the disk can be placed in a mechanism that simulates operation of a disk and head(s) in an assembled hard drive. However, assembling the full drive will save processing steps in the event that the drive passes initial testing. In step 84, the drive is tested using standard tests to determine whether the error rate is acceptable. This test may include writing data to some or all of the write area of both sides of the disk, then reading the data and identifying errors. The data may be written in one large write operation, in increments with immediate or delayed readback, etc. In step 86, the results of the testing are quantified and optionally stored, preferably on the drive. If the number of errors is above a predetermined threshold, the head fails. Note step 88. Then, in step 90, additional testing is performed to determine whether the cause of the errors lies with a board, cable, disk or one of the heads.

Figure 6:
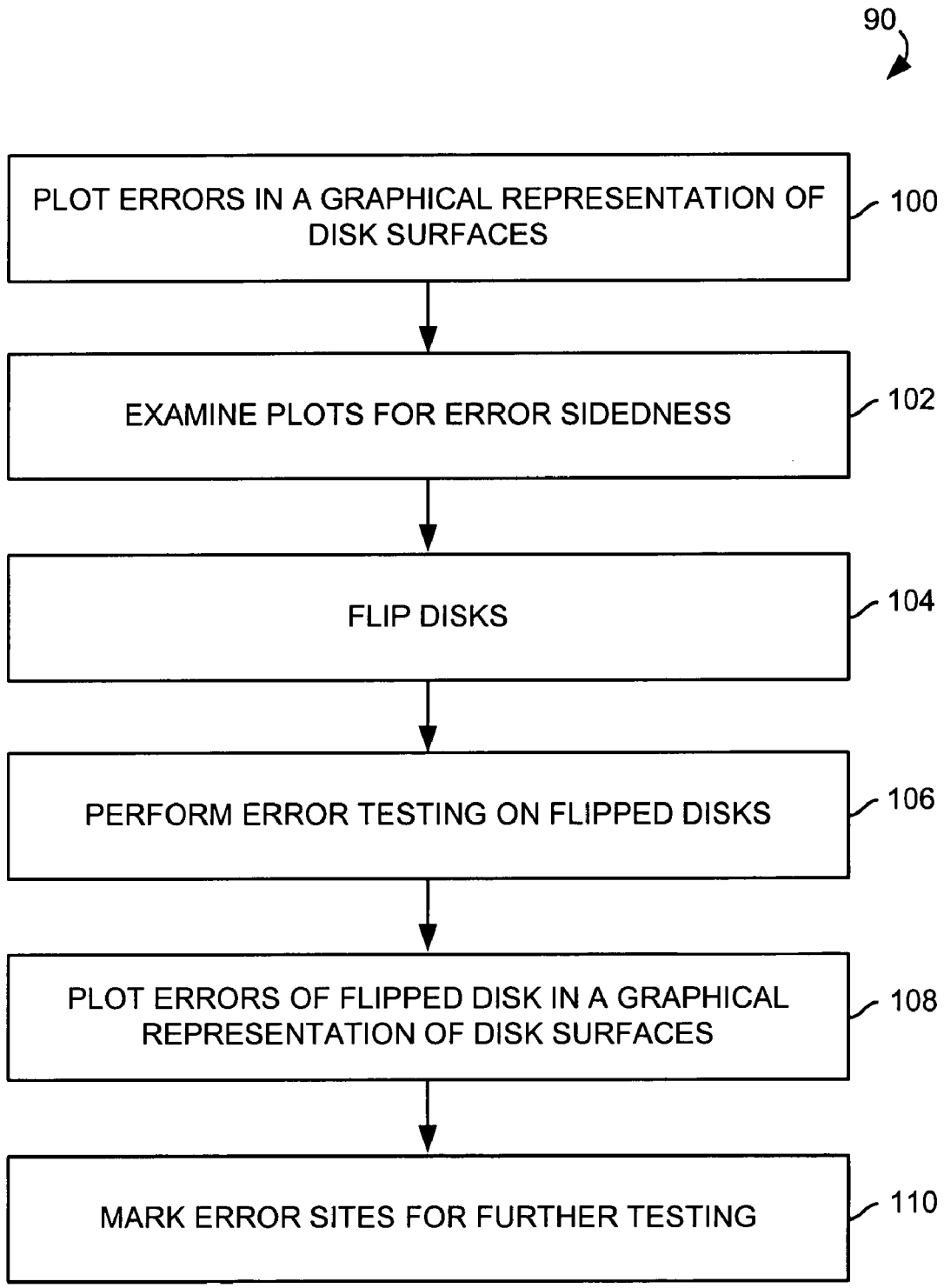
FIG. 6 illustrates the additional steps performed during step 90 of FIG. 5.

FIG. 6 illustrates the additional steps performed during step 90. In step 100, at least some of the errors are plotted on a graphical representation of each side of the disk. The plots are then examined for error sidedness and number of errors in step 102. Each disk in a drive has two sides. Typically when problems are encountered on a disk, unless it is a magnetic problem, defects tend to occur more on one side than the other. If the plots indicate that there is a sidedness to the errors, the flowing steps are performed on the drives that fail. The disks showing sidedness of errors are then flipped 180 degrees and reinstalled in the drive in step 104. In step 106, some or all areas on both sides of the disk are again written to and defective bits are plotted. In step 108, the errors on the disk are again plotted to determine whether the exact same side of the disk shows a sidedness of errors after the flip, i.e., whether the errors follow the exact same side of the disk. If the exact same side of the disk shows error sidedness, the problem probably lies with the disk. If the error sidedness remains on the top or bottom of the disk during both write/read tests, the problem is probably due to a defective head.

In step 110, after determining that the errors follow the same side of the disk, some or all of the error sites are marked for analytical examination, such as subsequent visual inspection of the disk surface. The disk can be visually inspected for scratches, missing areas of thin film, etc. Then other analyses can be performed to determine what caused the defect. For instance, foreign materials found in scratches on the disk surface may indicate what caused the scratches.

One way to mark sites for visual inspection includes causing magnetic particles to adhere to the disk near the error sites. In an illustrative method for marking error sites, a series of tracks or data bits around a representative portion of the defects are erased to mark the error sites. Then Bitter fluid, i.e., fluid with magnetic particles that adhere to the areas on the disk surface that have not been erased, is spun onto the disk. The adhering particles optically define where the errors are located, which can then be examined under a microscope to determine what type of defect caused the errors. In another illustrative method for marking error sites, a candela is used. The candela uses a light scattering technique to identify defects on the disk surface. The candela scribes the defect, providing a location of the defect. The person or machine analyzing the disk can then follow a pointer to the location of the defect and examine the disk surface.

Figure 7A:
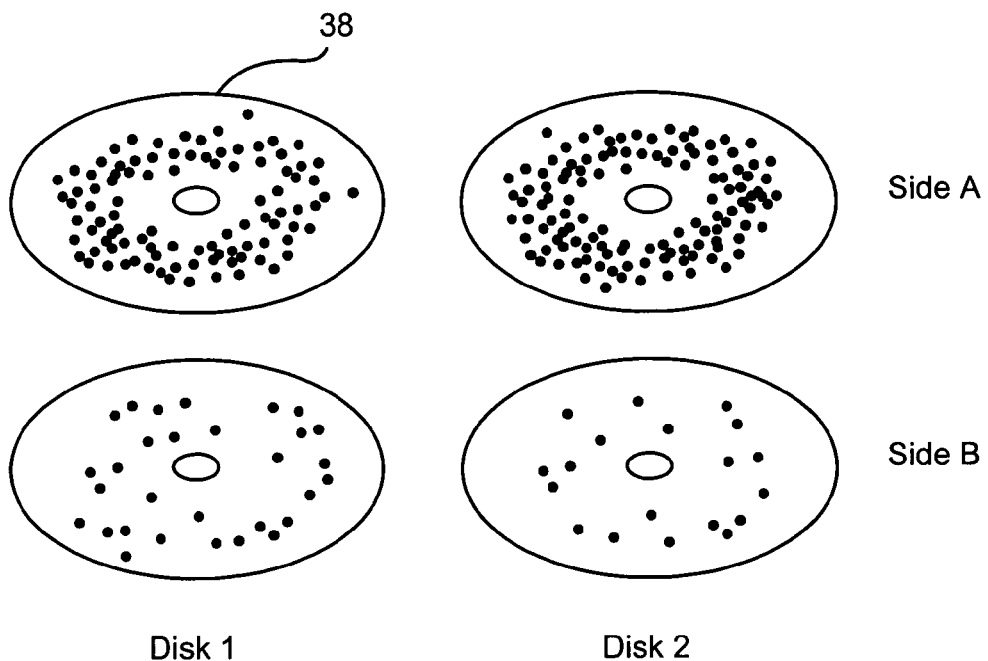
FIG. 7A illustrates a plot of errors on sides A and B of each disk in a stack of disks in a disk drive.

FIG. 7A illustrates a plot of errors on sides A and B of each disk 38 in a stack of two disks in a disk drive. The dark spots are read errors. As shown, the errors are banded and occur most prevalently on side A of each disk. At this point, it is unknown whether the problem is the disk or the head (read and/or write errors). All that is seen at this point is error sidedness.

Figure 7B:
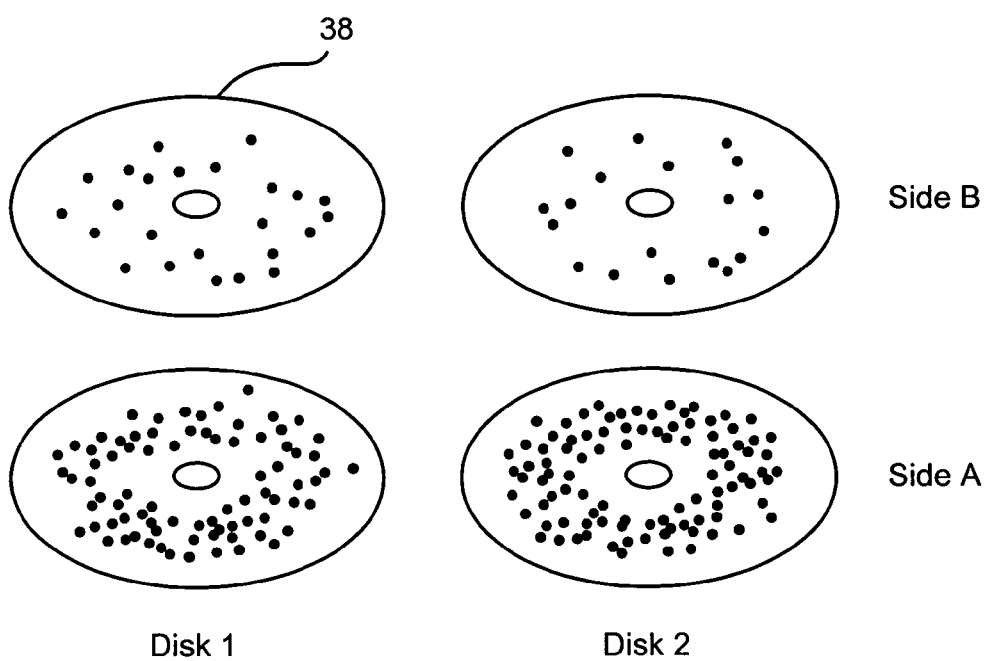
FIG. 7B illustrates a plot of errors on sides A and B of each disk of FIG. 7A after the disks are flipped.

FIG. 7B illustrates a plot of errors on sides A and B of each disk 38 after the disks are flipped. Now, the errors are most prevalent on the bottom sides of the disks, indicating that the problem is on the same side (A) of the disk, i.e., the errors follow the disk. This in turn indicates that a problem exists in the formation or processing of side A of the disks. Note that the plots may appear different due to the different tolerances of the sliders on the bottom as opposed to the top, the fly heights, etc. Also note that if the problem is the head, cable, or a circuit in the drive, the error patterns should remain on the top or bottom of the disk, even after the disk is flipped.

As mentioned above, one cause of errors is scratches on the disk surface. Scratches can be formed during burnishing of the disk, for example. Disks are constructed of a substrate. Then the thin magnetic film is sputtered onto the substrate. Then the disk is lubricated. After that, the disks are burnished. In a tape burnishing process, a tape polishes the disk surface to smooth the disparities on the disk surface created by the sputtering. However, tape flutter can cause the rough edge of the tape to scratch the disk. A visual inspection can be used to identify the scratches. Remnant pieces of tape material found in the scratches will indicate that the tape caused the scratches.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for identifying a problem with a magnetic disk, comprising:
    testing both sides of a disk for read errors using a pair of heads;
    flipping the disk 180 degrees;
    again testing both sides of the disk for read errors using the same heads;
    determining whether one side of the disk has more errors than the other side both before and after the flip; and
    determining that the disk is the cause of the read errors if the same side of the disk still has more errors than the other side after the flip.

2. A method as recited in claim 1, wherein the disk and heads are installed in a disk drive prior to testing.

3. A method as recited in claim 1, further comprising plotting at least some of the errors on a graphical representation of each side of the disk, wherein the plots are used to determine whether one side of the disk has more errors than the other side both before and after the flip.

4. A method as recited in claim 1, wherein the root cause failure analysis of the disk includes a visual inspection of the disk.

5. A method as recited in claim 4, wherein sites of errors on the disk are marked for visual inspection.

6. A method as recited in claim 5, wherein the error sites on the disk are marked using magnetic particles.

7. A method as recited in claim 5, wherein the error sites on the disk are marked using a candela.

8. A method as recited in claim 1, further comprising performing root cause failure analysis on the disk if the same side of the disk still has more errors than the other side after the flip.

9. A method as recited in claim 1, further comprising performing root cause failure analysis on at least one of a circuit and a head of the disk drive if the same side of the disk does not have more errors than the other side after the flip.

10. A method for identifying a problem in a hard disk drive, comprising:
    assembling a hard disk drive having a two-sided disk and a pair of heads;
    testing both sides of the disk in the drive for read errors;
    quantifying the number of errors;
    passing the drive if the number of errors is below a predetermined threshold;
    failing the drive if the number of errors is above the predetermined threshold;
    removing the disk from the drive;
    flipping the disk 180 degrees;
    reinstalling the disk in the drive;
    testing both sides of the disk in the drive for read errors using the same heads;
    determining whether one side of the disk has more errors than the other side both before and after the flip;
    performing root cause failure analysis on the disk if the same side of the disk still has more errors than the other side after the flip; and
    performing root cause failure analysis on at least one of a circuit and a head of the disk drive if the same side of the disk does not have more errors than the other side after the flip.

11. A method as recited in claim 10, further comprising plotting at least some of the errors on a graphical representation of each side of the disk, wherein the plots are used to determine whether one side of the disk has more errors than the other side both before and after the flip.

12. A method as recited in claim 10, wherein the root cause failure analysis of the disk includes a visual inspection of the disk.

13. A method as recited in claim 12, wherein sites of errors on the disk are marked for visual inspection.

14. A method as recited in claim 13, wherein the error sites on the disk are marked using magnetic particles.

15. A method as recited in claim 13, wherein the error sites on the disk are marked using a candela.

16. A method for identifying a problem in a hard disk drive, comprising:
    assembling a hard disk drive having a two-sided disk and a pair of heads;
    testing both sides of the disk in the drive for read errors;
    quantifying the number of errors;
    passing the drive if the number of errors is below a predetermined threshold;

failing the drive if the number of errors is above the predetermined threshold;
removing the disk from the drive;
flipping the disk 180 degrees;
reinstalling the disk in the drive;
testing both sides of the disk in the drive for read errors using the same heads;
plotting at least some of the errors on a graphical representation of each side of the disk;
determining whether one side of the disk has more errors than the other side both before and after the flip based on the plots; and
performing root cause failure analysis on the disk if the same side of the disk still has more errors than the other side after the flip.

17. A method as recited in claim 16, wherein the disk and heads are installed in a disk drive prior to testing.

18. A method as recited in claim 16, wherein the root cause failure analysis of the disk includes a visual inspection of the disk.

19. A method as recited in claim 18, wherein sites of errors on the disk are marked for visual inspection.

20. A method as recited in claim 19, wherein the error sites on the disk are marked using magnetic particles.

21. A method as recited in claim 19, wherein the error sites on the disk are marked using a candela.

22. A method as recited in claim 16, further comprising performing root cause failure analysis on at least one of a circuit and a head of the disk drive if the same side of the disk does not have more errors than the other side after the flip.

* * * * *